（12）United States Patent
Yu et al.

(10) Patent No.: US 11,567,243 B2
(45) Date of Patent: Jan. 31, 2023

(54) TESSELLATED BEZEL LUMINAIRES

(71) Applicant: Vode Lighting, LLC, Sonoma, CA (US)

(72) Inventors: Scott Yu, Tiburon, CA (US); Richard Wong, Santa Clara, CA (US)

(73) Assignee: Vode Lighting, LLC, Sonoma, CA (US)

( * ) Notice: Subject to any disclaimer, the term of this patent is extended or adjusted under 35 U.S.C. 154(b) by 83 days.

(21) Appl. No.: 17/320,899

(22) Filed: May 14, 2021

(65) Prior Publication Data
US 2022/0365255 A1 Nov. 17, 2022

(51) Int. Cl.
*G02B 5/00* (2006.01)
*G02B 5/02* (2006.01)
*F21V 3/04* (2018.01)
*F21Y 115/10* (2016.01)

(52) U.S. Cl.
CPC ............ *G02B 5/0221* (2013.01); *F21V 3/049* (2013.01); *F21Y 2115/10* (2016.08)

(58) Field of Classification Search
CPC .. G02B 5/0215; G02B 5/0221; G02B 5/0284; F21V 7/041; F21V 7/04; F21V 7/048; F21V 7/049
See application file for complete search history.

(56) References Cited

U.S. PATENT DOCUMENTS

| | | | |
|---|---|---|---|
| 9,640,741 B1 * | 5/2017 | Lin | G02B 19/0061 |
| 2014/0133143 A1 * | 5/2014 | Ebner | G02B 27/0961 |
| | | | 264/2.7 |
| 2020/0133013 A1 * | 4/2020 | Sales | G02B 27/0944 |
| 2022/0252226 A1 * | 8/2022 | Gielen | F21K 9/232 |

* cited by examiner

*Primary Examiner* — Gerald J Sufleta, II
(74) *Attorney, Agent, or Firm* — Michael Petrin; Peter Tormey; A, T and P Attorneys

(57) ABSTRACT

The present invention relates generally to tessellated bezel light diffusers which act to disperse penumbral light providing more uniform and even illumination. The present invention also relates to luminaires employing an array of light sources with tessellated bezel light diffusers which act to eliminate edge and transition lighting effects providing more uniform and even illumination between LEDs and at the periphery of illuminated zones. The present invention also relates to luminaires employing LED arrays equipped with tessellated bezel light diffusers that provide very uniform illumination zones with more evenly dispersed transitional edge lighting than conventional luminaires.

11 Claims, 10 Drawing Sheets

200

A
Side View

B
Back Perspective View

TESSELLATED BEZEL LUMINAIRES

BACKGROUND

The present invention relates generally to tessellated bezel light diffusers which act to disperse light into a three-dimensional space providing more uniform and even illumination. The present invention also relates to luminaires and illumination systems employing an array of solid state light sources with tessellated bezel light diffusers which act to eliminate edge and transition lighting effects providing more uniform and even illumination, particularly at transitions between penumbral and illuminated zones, and their peripheries. The present invention also relates to luminaires employing LED arrays equipped with tessellated bezel light diffusers that provide very uniform illumination zones with more evenly diffuse transitional edge lighting than conventional luminaires.

DESCRIPTION OF RELATED ART

Light emitting diodes (LEDs) have been utilized since about the 1960s. However, for the first few decades of use, the relatively low light output and narrow range of colored illumination limited the LED utilization role to specialized applications (e.g., signal and indicator lamps). As light output improved, LED utilization within other lighting systems, such as within LED "EXIT" signs and LED traffic signals, began to increase. Over the last decade, the white light output capacity of LEDs has more than tripled, thereby allowing the LED to become the lighting solution of choice for a wide range of lighting solutions, replacing fluorescent lamps and lighting systems, particularly due to their low power consumption, longevity and low cost.

LEDs exhibit significantly optimized characteristics for use in lighting fixtures, such as source efficacy, optical control and extremely long operating life, which make them excellent choices for general lighting applications. LED efficiencies, for example, may provide light output magnitudes that may exceed 200 lumens per watt of power dissipation. Energy savings may, therefore, be realized when utilizing LED-based lighting systems as compared to the energy usage of, for example, incandescent, halogen, compact fluorescent and mercury lamp lighting systems. One particular advantage of LEDs is that they may be directly attached or mounted to a printed circuit board (PCB), which may include conductive regions (e.g., conductive pads to dissipate heat) and associated control circuitry. The LED control terminals (e.g., the anode and cathode terminals of the LEDs) may be interconnected via the conductive pads, such that power supply and bias control signals may be applied to transition the LEDs between conductive and nonconductive states, thereby illuminating the LEDs on command and enabling the simultaneous control of an array of LEDs.

The photometric distribution of a forward-biased LED may produce a cone-shaped or omnidirectional pattern of light of varying angle up to about either a 120 degree full width half max (FWHM), or a full 180 degree full emitting pattern emanating in all directions from a surface of the PCB upon which the LED is mounted), producing a center illumination zone surrounded by a penumbral illumination zone transitioning to an outer zone absent any illumination. In order to modify such an omnidirectional photometric distribution, a diffuser element, lens or other typically transparent or translucent plastic diffuser element (e.g., an injection molded acrylic plastic cover with pixelated texture) may be placed over the LED for the purpose of more uniformly dispersing the LED light and eliminating a center "hotspot" or concentration of light emanating from the center of the LED. However, while a diffuser element may be used to modify the photometric distribution pattern from that of an omnidirectional pattern to one of a non-omnidirectional pattern (e.g., a 120 degree spread of light emanating from a surface of the PCB), the intermediate diffuser still absorbs some of the incident light, resulting in some reduction of light intensity through absorption and internal reflection, owing to the typically smooth, shiny and non-textured side of the diffuser being oriented opposite the illumination source. Further, typical diffusers act to better disperse the more intense light originating from the LED at and near the normal incidence angle (i.e. perpendicular to the surface of the LED and generally parallel to the field of illumination (lighted surface) that is desired to be lit uniformly across its surface, so that differences in illumination along the edges, particularly at locations where the incident radiation angles exceed the normal 90 degree axis by more than about 30 to 45 degrees are not diffused as well owing to the more oblique angle of illumination towards the edges compared to the center zone of the diffuser.

Alternatively, one or more optical lens may be mounted forward of the LED to further control the photometric distribution of the LED illumination field. However, this approach requires a special lens design to correct for f-number and spherical aberrations of the lens to transform the LED's typical centered conical illumination pattern into a flat or uniform illumination area or 3D space. While a tailored lens system, such as the innovative batwing-style lens diffuser system of Vode (Vode Lighting, LLC, 21684 8th St. E., Suite 700, Sonoma, Calif. 95476) may alternatively be employed instead of a (flat) diffuser element, the lens adds weight to the luminaire and adds two additional optical surfaces that result in some loss of light due to refraction and reflection processes, as well as presenting two additional surfaces that can collect dust, scratches and otherwise degrade with respect to optimum light transmission over time.

Accordingly, there is a need for some other means of diffusing the illumination pattern of a light source, an LED or array of LEDs, and in particular a better means to provide a more uniform, more diffuse and more evenly dispersed illumination at the edges or periphery of an illuminated zone or penumbral region. Further, some means is also desired that does not require an intermediary diffuser or lens element spaced apart from or located in series conjunction to the source light or LED element or its normal optical axis.

To address this need, one object of the instant invention relates generally to tessellated bezel light diffusers which act to disperse penumbral light providing more uniform and even illumination.

A further object of the instant invention relates to luminaires employing an array of light sources with tessellated bezel light diffusers which act to eliminate edge and transition lighting effects providing more uniform and even illumination between LEDs and at the periphery of illuminated zones.

A yet further object of the instant invention is a method of improving luminaires employing LED arrays by equipping them with tessellated bezel light diffusers that provide very uniform illumination zones with more evenly dispersed transitional edge lighting than conventional luminaires.

SUMMARY

To overcome limitations in the prior art, and to overcome other limitations that will become apparent upon reading and understanding the present specification, various inventive embodiments of the present disclosure describe methods and apparatus for the more uniform projection and dispersion of light from a light source or an LED-based lighting system employed standalone or in a luminaire or an array of luminaires.

One inventive embodiment of the instant disclosure is a luminaire with improved light dispersion properties having (a) at least one or a plurality of light emitting elements; (b) at least one or a plurality of light shades each positioned adjacent to and surrounding one of the light emitting elements and located about an optical axis perpendicular to the light emitting element; wherein the light shade features a mounting region located at a first distal edge, a plain light shade region continuous with the mounting region, being continuous with a bezel region located adjacent to the plain light shade region and terminating at a second opposed proximate edge; wherein the bezel region features an upper surface having at least one tessellated edge; and wherein the tessellated edge provides for a more uniform direct and penumbral light transmission pattern, as shown and disclosed in the following description and figures hereinbelow.

A related inventive embodiment further includes a housing element; wherein the housing element supports the light emitting element and the light shade; wherein the mounting region of the light shade is attachable to the housing; and wherein the light emitting element is positioned so that its optical transmission axis is coincident to an optical axis passing through the center of the light shade. Yet another related embodiment features a mounting system for securing the housing element and providing electrical connectivity means to connect the light emitting element to a power source.

A further inventive embodiment features a bezel region having at least one or a plurality of tessellation patterns in a shape selected from an catenary, cosine, arc cosine, hyperbolic cosine, hyperbola, sine, arc sine, hyperbolic sine, polynomial, and combinations thereof. In other related embodiments, the inventive bezel region features at least one or a plurality of tessellation patterns in a shape comprising either a full or partial geometric pattern selected from a circle, ellipse, square, rectangle, triangle, polygon, and combinations thereof.

In yet further related embodiments, the luminaire has a bezel region featuring at least one or a plurality of tessellation patterns corresponding to a k-th degree polynomial fit of a shape comprising either the full or partial geometric pattern; and wherein k is an integer between 1 and 5; or alternatively a bezel region with at least one of a plurality of tessellation patterns corresponding to a n-fractal derivative of the geometric pattern; and wherein n is an integer between 1 and 5.

In other embodiments the tessellation pattern may be discontinuous, for example including one or more bezel regions featuring a combination of a non-tessellated region and a tessellated region; and wherein the tessellated region has at least one tessellated pattern and the non-tessellated region is plain. In some embodiments, the one or plurality of light shades is symmetrically disposed and centered about an optical axis perpendicular to each of the light emitting elements. In an array configuration, other related embodiments of the present disclosure include multiple light shades that bear at least one portion of the same bezel pattern as an adjacent light shade, and wherein each of the bezels is at least partially tessellated.

In a related embodiment to that immediately above, each of the light shades may bear at least one unique bezel pattern with at least one tessellation pattern differing from the tessellation pattern of an adjacent light shade. In yet another related embodiment, one or a plurality of the light shades feature an angled bezel region that is at least partially tessellated and is disposed about an optical axis that is not perpendicular to that of the light emitting elements.

Further inventive embodiments include luminaires with a light shade element having an overall geometry selected from shapes including a circle, ellipse, square, rectangle, polygon or free-form closed geometric shape; wherein polygons include triangles, pentagons, hexagons and octagons; and wherein the optical axis corresponds to the mean geometric center axis of the selected shape.

In another series of related embodiments is a luminaire bearing at least one or a plurality of light shades wherein at least one of the light shades is linearly disposed without closing upon itself and is at least partially tessellated along a portion of the bezel.

In a closely related embodiment for a linearly disposed luminaire, the luminaire features two light shades that are disposed opposite one another and aligned with respect to a horizontal axis passing through each of the light emitting elements associated with each light shade; and wherein at least one of the light shades feature at least one partially tessellated edge along a portion of the bezel.

Broadly contemplated by the instant invention are embodiments employing a method of providing improved uniformity of illumination from a luminaire comprising substitution of a plain bezel with a tessellated bezel having at least one partially tessellated portion thereof; wherein the tessellated portion is formed by either addition to or subtraction of material from the outer proximate edge of the bezel portion of one or a plurality of lighting units comprising the luminaire.

While tessellation patterns may be formed by a combination of one segment being a portion of material with a second segment being a hole or absent portion of material to form a unit tessellate cell, further embodiments of the instant disclosure include a luminaire with a light shade with tessellations formed by the combination of opaque, non-light transmitted portions and light-transmitting portions that optically mimic the material tessellation patterns disclosed herein, thus being referred to as optical tessellation patterns. Accordingly, further inventive embodiments of the instant invention include luminaires with improved light dispersion properties comprising (a) at least one or a plurality of light emitting elements; (b) at least one or a plurality of light shades each positioned adjacent to and surrounding one of the light emitting elements and located about an optical axis perpendicular to the light emitting element; wherein the light shade features a mounting region located at a first distal edge, a plain light shade region continuous with the mounting region, being continuous with a bezel region located adjacent to the plain light shade region and terminating at a second opposed proximate edge; wherein the bezel region features a first upper surface and second lower transition region adjacent to the plain light shade region; wherein the bezel region features a combination of a first opaque and non-light transmitting portion composed of a first material and a second light transmitting portion composed of a second material; wherein the first and second portions create an optical tessellation pattern; and wherein the optical tessellation pattern provides for a more uniform direct and penumbral light transmission pattern.

In related embodiments to those disclosed immediately above, the luminaire may feature a bezel wherein the second light transmitting portion is selected from a second material that is clear, translucent or partially light-transmitting; wherein the first material may either be a different material than the second material, or the second material infused or treated to provide opacity thereto so that the first portion is opaque and non-light transmitting.

A corresponding Figure Key detailing the specific components, parts, regions and means of the inventive embodiments as shown in the accompanying figures is attached hereinbelow in the Appendix, which is hereby incorporated by reference.

DESCRIPTION

Generality of Invention

This application should be read in the most general possible form. This includes, without limitation, the following:

References to specific techniques include alternative and more general techniques, especially when discussing aspects of the invention, or how the invention might be made or used.

References to "preferred" techniques generally mean that the inventor contemplates using those techniques, and thinks they are best for the intended application. This does not exclude other techniques for the invention, and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Read this application with the following terms and phrases in their most general form. The general meaning of each of these terms or phrases is illustrative, not in any way limiting.

DETAILED DESCRIPTION

Figure 1:
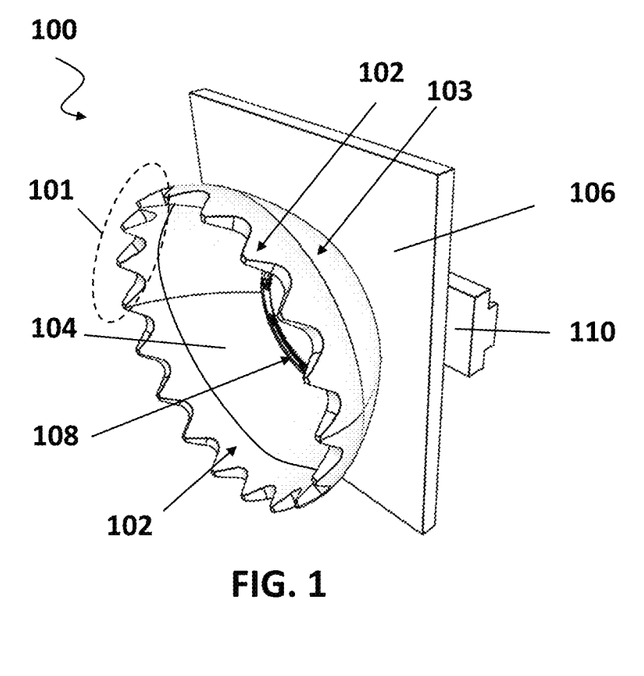
FIG. 1 shows an individual LED lighting unit with a fully tessellated bezel and light shade.

FIG. 1 shows one inventive embodiment according to the present disclosure of a lighting unit 100 featuring a support plate 106 connected to a light shade mounting region 108 and an LED mounting rail 110, and in turn connected to a distal portion of a light shade element 104 that features a plain light shade region 103 located immediately adjacent to a terminal tessellated bezel region 102 that extends continuously along the proximate portion or outer perimeter of light shade 104 and which features a plurality of tessellations 101 located along the outer perimeter of 102. In this embodiment, the plurality (18 count) of tessellations 101 each have a shape resembling a catenary or sinusoidal curve with peaks adjacent to and defining the proximate edge of the tessellated bezel region 102 and valleys associated with the peaks being adjacent to the distal or inner edge of region 102 that is connected to the plain light shade region 103, and which together make up the light shade element 104 of the lighting unit 100. In related embodiments of the present disclosure, a light source other than an LED can be used, and the LED mounting rail 110 adapted to accommodate a different light source.

The tessellate patterns 101 located on the outer edge or periphery of tessellated bezel region 102 act to soften and disperse the penumbral shadow edge otherwise produced by a flat or plain (non-tessellated) edge at the transition between the directly illuminated zone and the non-illuminated zone produced by emitted and diffracted light passing this edge and as projected onto a surface or illumination pane. Regardless of the smoothness of a flat or plain edge, an opaque light shade tends to cast light in a pattern producing a combination of a directly illuminated zone owing to direct light rays, and a penumbral illuminated zone owing to both direct and scattered light rays incident to the surface illuminated by the light source, surrounded by a non-illuminated zone of darkness transitioning outward from the outer edge of the penumbral zone. The transition between the directly illuminated zone and the penumbral zone is typically visually distinct and readily perceived by the human eye, resulting in the overall perception of the lighting field being substantially non-uniformly illuminated. To a slightly lesser extent, the eye also perceives the transition between the outer periphery of the penumbral zone and the non-illuminated zone into which no direct or scattered light is directed. According to inventive embodiments of the present disclosure, one or a plurality of tessellations 101 on the outer edge of the bezel region 102 of the light shade element 104 serve to diffuse the differences in the degree of illumination between the direct and penumbral zones to produce a more uniform lighting effect that is more pleasing to the human eye and which decreases the difference in perceived illumination between these two zones. Without being bound by theory, it is believed that this effect is achieved by a combination of extending the effective width of the direct-penumbral transition zone, and also due to increased scattering and mixing of direct light illumination into the penumbral zone on both the interior and anterior edges of the penumbral illumination zone. Accordingly, the inventive tessellations on the bezel in the embodiments disclosed here result in a smoother transition between the center illumination zone and the interior edge of the penumbral zone as well as a smoother transition between the anterior edge of the penumbral zone and the non-illuminated zone. This improved uniformity and dispersion of light is achieved by the present invention without the need for a filter, lens or other optical diffuser, thus providing an additional advantage of increased light output as there is no intermediate material present between the light source and the illumination area or plane to be lighted.

Figure 2:
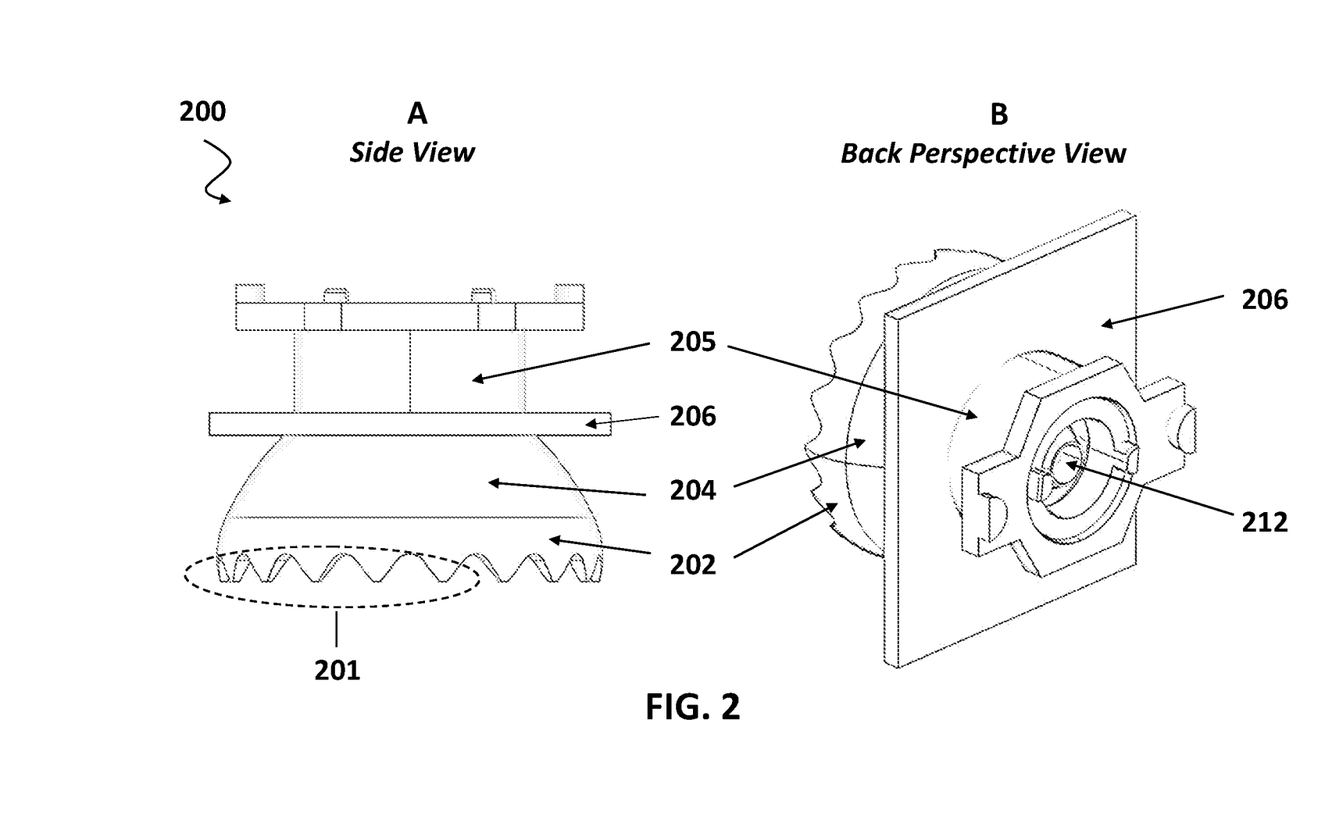
FIG. 2 shows an individual LED lighting unit from side and back perspective views.

FIG. 2 shows another inventive embodiment of a lighting unit 200 that features a light shade element 204 having a light shade LED region 205 adjacent to a plain light shade region 203 which is adjacent to a tessellated bezel region 202 which defines the proximate perimeter of 204. Not shown in the side view A is the light shade mounting region 208 which attaches to a receptive (circular) opening in the support plate 208, which acts to secure the light shade element to the support plate 208 for the purpose of mounting 204 in a receptive luminaire housing or onto a luminaire rail system. Generally, the LED or light source is positioned in the LED attachment region 212 so that the origin of the illumination is positioned at an internal focal point or locus of the light shade element 204, as seen in the back perspective view B. In the inventive embodiments illustrated in FIG. 2, the tessellations on the proximate edge of the light shade element are uniform in height, depth and spacing, forming a continuous pattern of tessellations along the periphery of the tessellated bezel region 202, the pattern being "in-phase" so that the pattern repeats consistently around the proximate edge without a disruption or break in the pattern.

Figure 3:
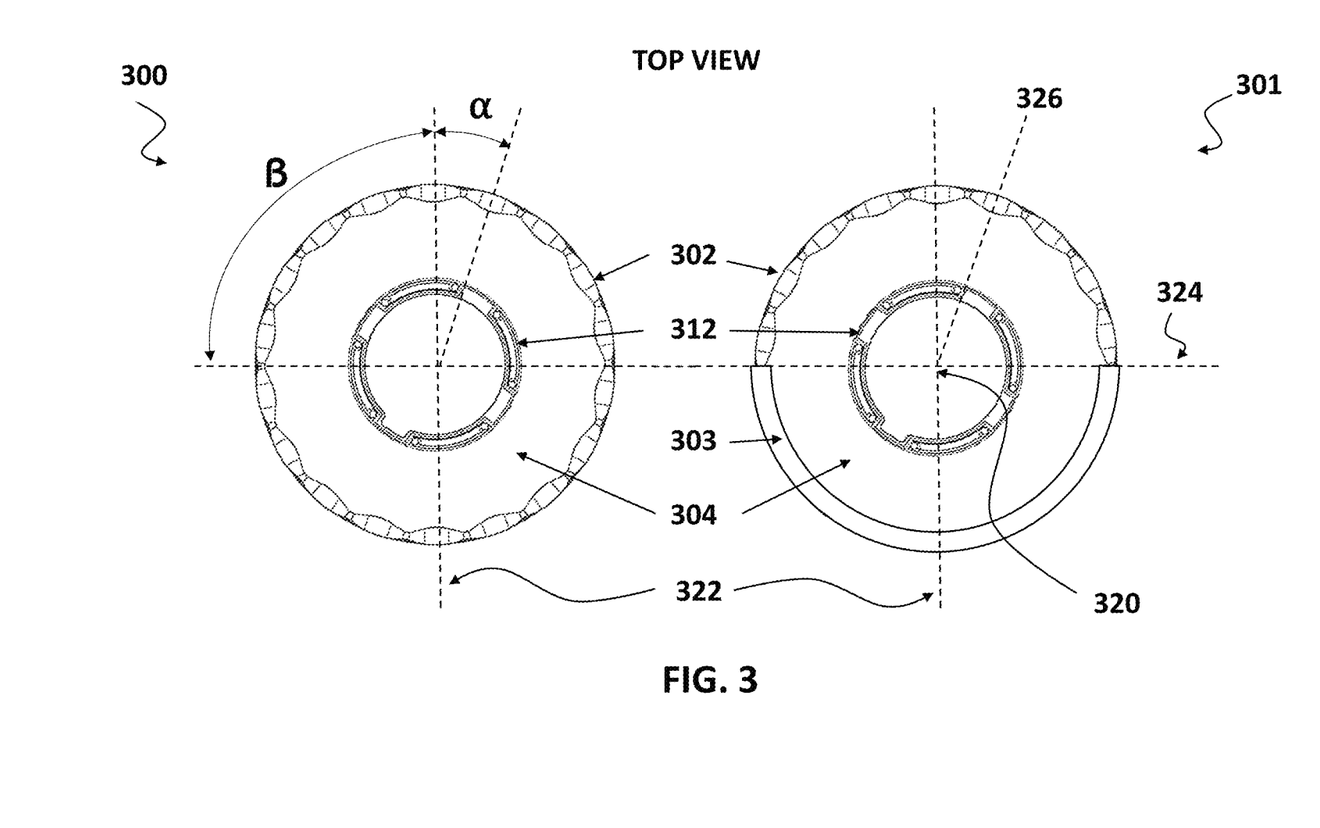
FIG. 3 shows embodiments of a fully and partially tessellated bezel pattern in a top view.

FIG. 3 shows alternative embodiments of the present disclosure in which the bezel region is either fully or partially tessellated. In FIG. 3, a fully tessellated lighting unit 300 features a tessellated bezel region 302 that spans the entire circumference of the bezel region of the light shade element 304. A plurality of tessellation patterns repeat, separated by an angle α (alpha) and totaling 18 tessellations around the circumference, a thus equaling 20° (degrees). In FIG. 3, a first horizontal axis 324 passes through the center rotation axis 320 of the lighting unit 300, and is perpendicular to the vertical axis 322 also passing through 320. In a second embodiment, a partially tessellated lighting unit 301 features a tessellated bezel region 302 and a plain or non-tessellated bezel region 303, which are adjacent to one another along the circumference of the bezel element and which meet at opposed sides of the bezel element with a 180 degree angular separation corresponding to angle 2β (beta) or 9α, the tessellated bezel region featuring 9 repeated tessellate patterns in embodiment 301 compared to the 18 tessellate patterns of embodiment 300.

In general, the angular angle of separation, α, between repeated tessellation patterns is equal to the angular extent of a single tessellation pattern, so that alpha is represented by:

$$\alpha(n) = 360°/n \qquad \text{Eq. 1}$$

wherein n=number of tessellations

Accordingly, the angle β is the angular extent of the tessellated bezel region, where each individually repeating tessellate unit pattern is denoted by n, so that beta is represented by:

$$\beta = \alpha + (n-1)(360°/n) \qquad \text{Eq. 2}$$

The above Equations 1 and 2 apply when the repeated tessellation patterns are all similar, e.g., being a unit pattern or reoccurring "cell". While the tessellations shown in the two inventive embodiments in FIG. 3 feature fully repeated tessellation patterns within the tessellated region of the bezel, n=18 for fully tessellated lighting unit 300 and n=9 for the partially tessellated lighting unit 301, other embodiments are contemplated in which the tessellation pattern can be interrupted or divided across the extent of an individual tessellate portion or cell, so that the junction between the tessellated bezel region (T) and the plain or non-tessellated bezel region (N) can vary, or in other words, the junction can be formed at any point of the tessellate portion at the interface where the two different bezel regions are joined. In other inventive embodiments of the present disclosure, two or more tessellated and non-tessellated portions of the bezel are also contemplated, for example an alternating pattern of T-N-T, or N-T-N-T in a generally circular of self-enclosing style that is contiguous and merges with itself over a 360° interval.

Also contemplated are inventive embodiments featuring generally linear bezels that do not curve back onto themselves, and are either fully tessellated along their length or extent, of also feature combinations of tessellated and non-tessellated regions, for example, a linear light shade having a single linear bezel with a pattern of N-T-N, or alternatively, T-N-T, or alternatively, N-T-N-T or T-N-T-N, or yet alternatively N-T-N-T-N or T-N-T-N-T, as illustrated yet non-limiting embodiments of the present disclosure. In yet other inventive embodiments, a series of lighting units in a linear array can feature one or two linear light shade elements in parallel, the light shade elements being on one or both sides of the linear array and running parallel with respect to the lighting elements so as to provide shading to either a first or second side of the linear lighting array. In these related embodiments of the present disclosure, the first and second bezels can be unique with respect to each other, for example one bezel being plain or non-tessellated and the second bearing tessellations or bearing zones of non-tessellated and tessellated regions, depending on the lighting effect desired. An example embodiment is discussed hereinbelow in FIG. 10.

In the embodiments shown in FIG. 3, the partially tessellated lighting unit 301 features a bezel that parallel with respect to a horizontal plane extending through the support plate (not shown) or the plane of the LED attachment region 312 (shown). In other inventive embodiments of the present disclosure, the two bezel regions, 302 and 303, may be contiguous with each other, yet formed at differing angles with respect to the horizontal axis. In yet further inventive embodiments, the bezel region of the lighting units can adopt other geometries other than being flat or being comprised of flat sections.

Figure 4:
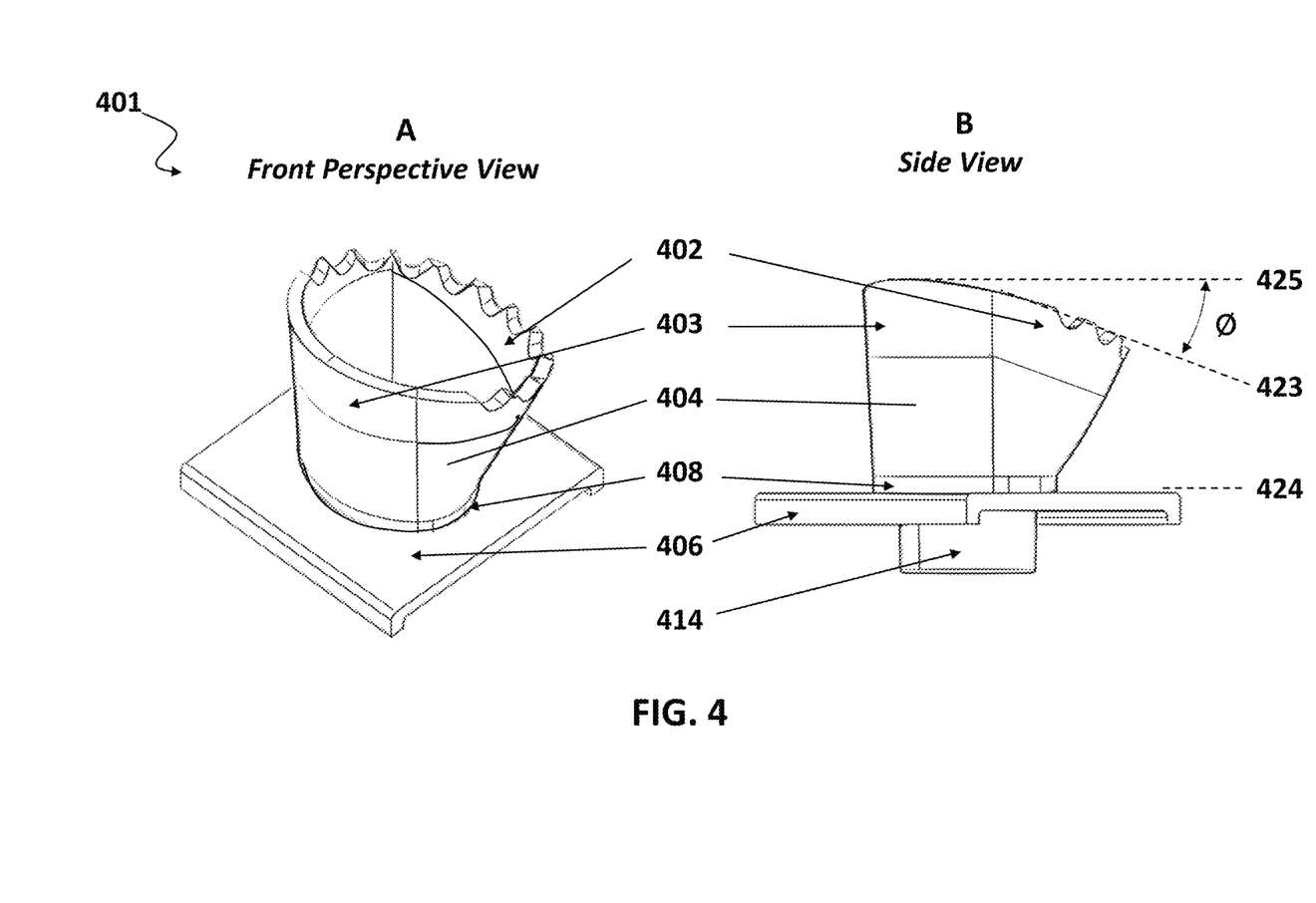
FIG. 4 shows an individual LED lighting unit featuring a partially tessellated bezel and light shade.

FIG. 4 shows an alternative inventive embodiment of the present disclosure with a lighting unit 401 featuring a partially tessellated bezel region 402 adjacent to and contiguous with a non-tessellated bezel region 403 on both sides of 403 to form a roughly circular-shaped bezel with combined tessellated and non-tessellated regions, combined with an angled bezel region. The surface or a plane parallel 425 to the surface of the tessellated bezel region 403 bears an angle of inclination denoted by the angle theta, Ø, line 423, with respect to the horizontal mounting plane 424 of the support plate 406. This particular embodiment represents a luminaire with a directional angle and a partially tessellated bezel to diffuse its emitted light over a 180° (semi-circular) angular field of illumination. In this embodiment, the light shade element 404 attaches to the support plate 406 at the light shade mounting region 408, being concentric with respect to the light source (not shown) positioned within the LED attachment element 414 and centrally located so that its emitted light is directed along the optical axis of the lighting unit 401.

Figure 5:
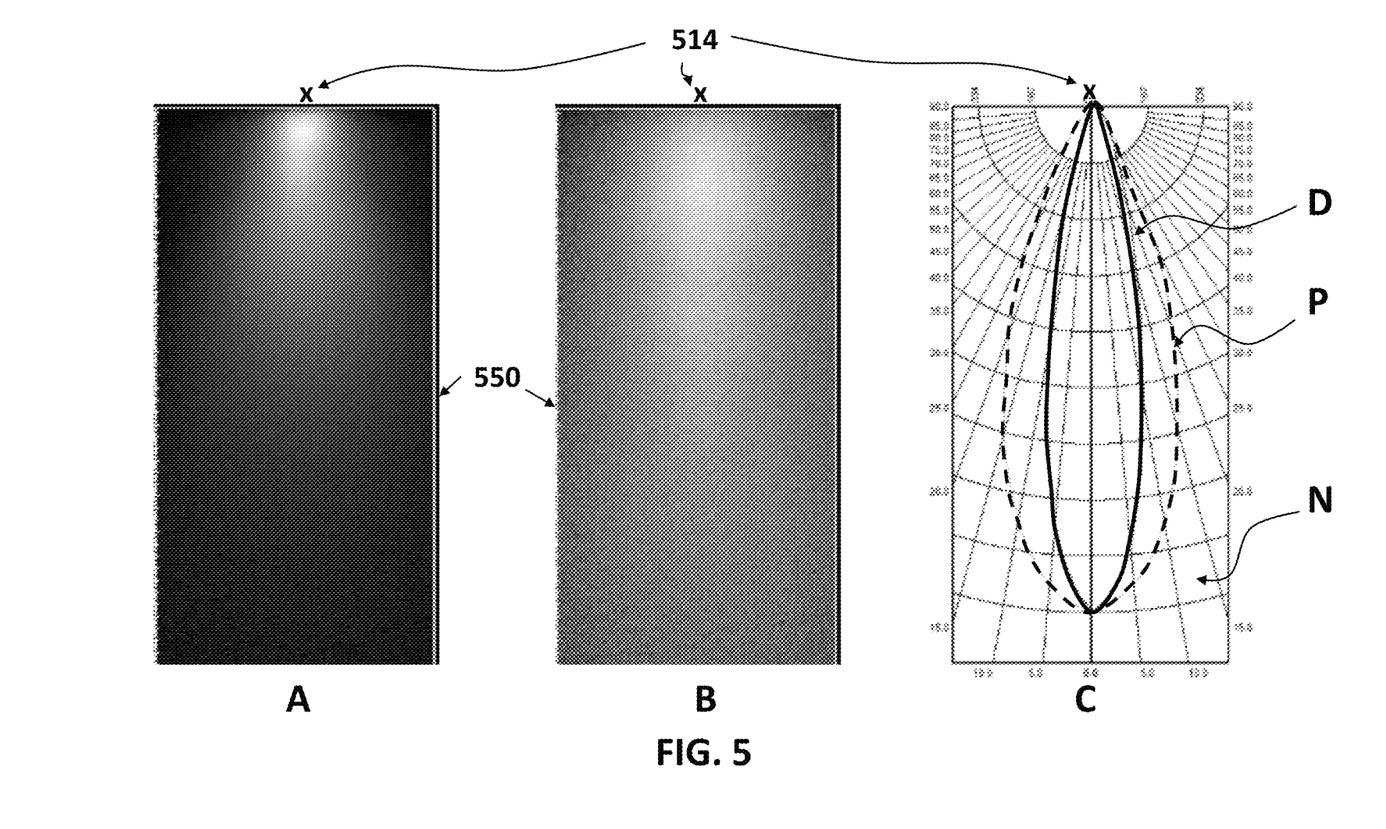
FIG. 5 shows real luminosities and a luminosity plot of a plain LED light source combined with a smooth bezel and a tessellated bezel pattern.

FIG. 5 shows actual illumination patterns on a flat surface or plane, (550, illumination plane) and a luminosity plot (panel C) of one inventive embodiment of the present disclosure (panel B), compared to a similar luminaire having an identical sized and powered light source, an LED 514, but without any bezel tessellations thus having a plain bezel (panel A). The light sources are each located at the upper top center at the position marked "x" of each illumination plain. In FIG. 5, the plain or non-tessellated bezel luminaire (panel A) produces a bright spot on the illumination plane with sharp edges between lighted and unlighted regions on the illumination plane, and with a minimal penumbral or transition zone between these regions. In contrast, the inventive embodiment featuring a partially tessellated bezel (as shown in FIG. 4) produces a more diffuse illumination pattern as seen in Panel B with broader illumination and a larger penumbral zone that better transitions between lighted and unlighted regions which creates a more pleasant overall lighting effect to the human eye while also producing a more uniformly dispersed lighting effect over the illumination plane.

Panel C shows a luminosity plot of projected light intensity as a function of angle and distance from the light source, x, of the tessellated bezel luminaire as shown in FIG. 4 and panel B, the plot showing uniformity in the emitted light pattern and a more gradual transition between the outer non-illuminated zone (N), the intervening penumbral zone (P) and the center zone of direct illumination (D).

Figure 6:
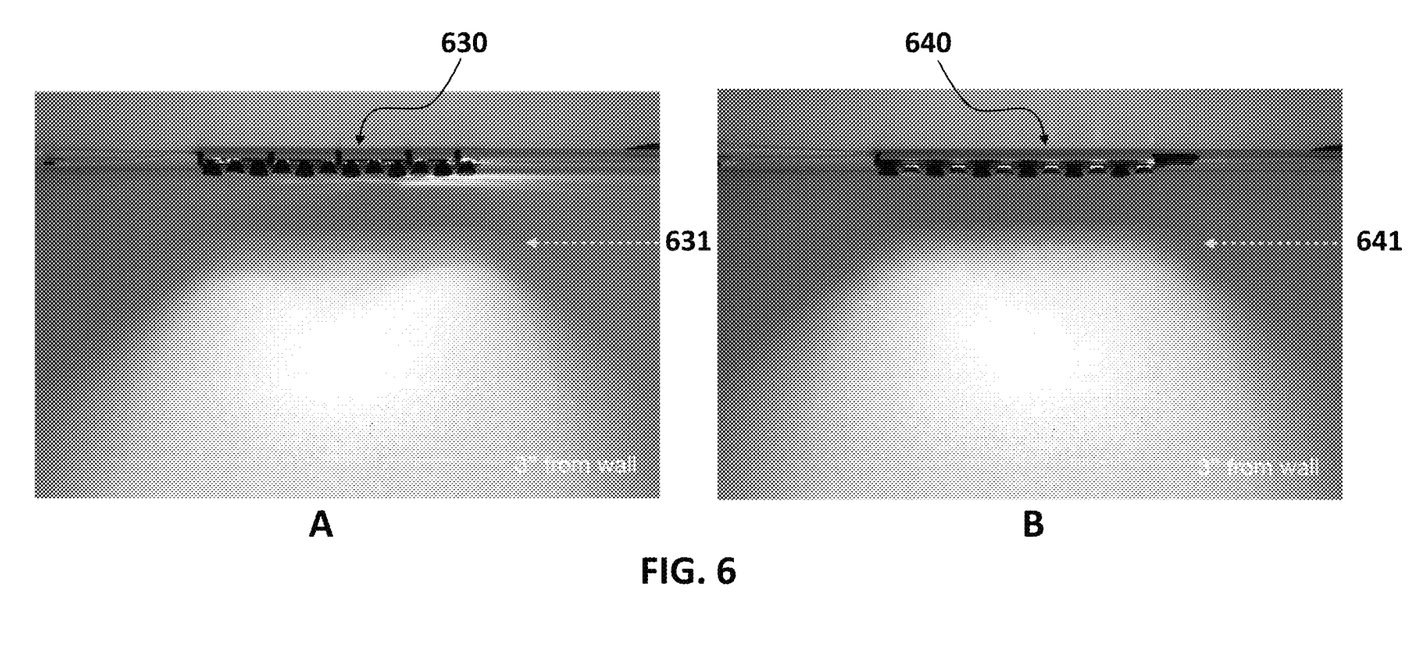
FIG. 6 shows real luminosities of a luminaire array featuring twelve LED light sources arranged next to a wall with six upwardly facing and six downward facing bezels arranged in an alternating pattern, with and without tessellated bezels.

While FIG. 5 shows the illumination characteristics of one inventive embodiment of the present disclosure (Panel B) compared to a non-tessellated version (Panel A), FIG. 6 shows the comparison of a linear array of the same lighting units spaced side-by-side in a linear array of twelve individual lighting units, with six of the lighting units arranged with the titled bezel facing upward (U), and alternating in an upward and downward pattern, with the remaining six arranged with their tilted bezels facing downward (D), or in a pattern corresponding to D-U-D-U-D-U-D-U-D-U-D-U, the linear array mounted on a first wall and positioned about 3" (inches) therefrom, with the arrays axis of illumination oriented parallel to the ceiling or second wall (illumination plane) as shown in Panels A and B.

In FIG. 6, a first array of non-tessellation lighting units 630 produces the illumination pattern shown in Panel A, while an inventive second array of tessellated bezels 640 corresponding to an array of lighting units similar to the embodiment shown in FIG. 4 produces an illumination pattern as shown in Panel B. Comparing the two lighting arrays, it is noted that the plain or non-tessellated array shown in Panel A produces a fan-like illumination pattern with a penumbral region 631 that is blotchy in appearance showing some non-uniformity in the transitions between the non-illuminated upper region and penumbral region and between the penumbral region and the illuminated region located on the bottom of the illumination panel. In contrast, while the tessellated array shown in Panel B produces a similar fan-like illumination pattern with a penumbral region 641, this inventive embodiment displays a penumbral zone that is markedly more uniform in appearance, with smoother lighting transitions between the non-illuminated upper region and the penumbral region as well as between the penumbral region and the illuminated region. This clearly illustrates that the use of even a partially tessellated array of lighting units acts to produce a much more uniform lighting effect with a smoother penumbral transition between non-illuminated and illuminated zones. In other inventive embodiments not shown, an even smoother transition is achieved when the array of inventive lighting units is repositioned so that the entire array of twelve units is oriented so that the position of the partially tessellated bezels are all aligned in one direction (D) with respect to a nearby wall, ceiling or surface to be illuminated.

Tessellation Patterns

Figure 7:
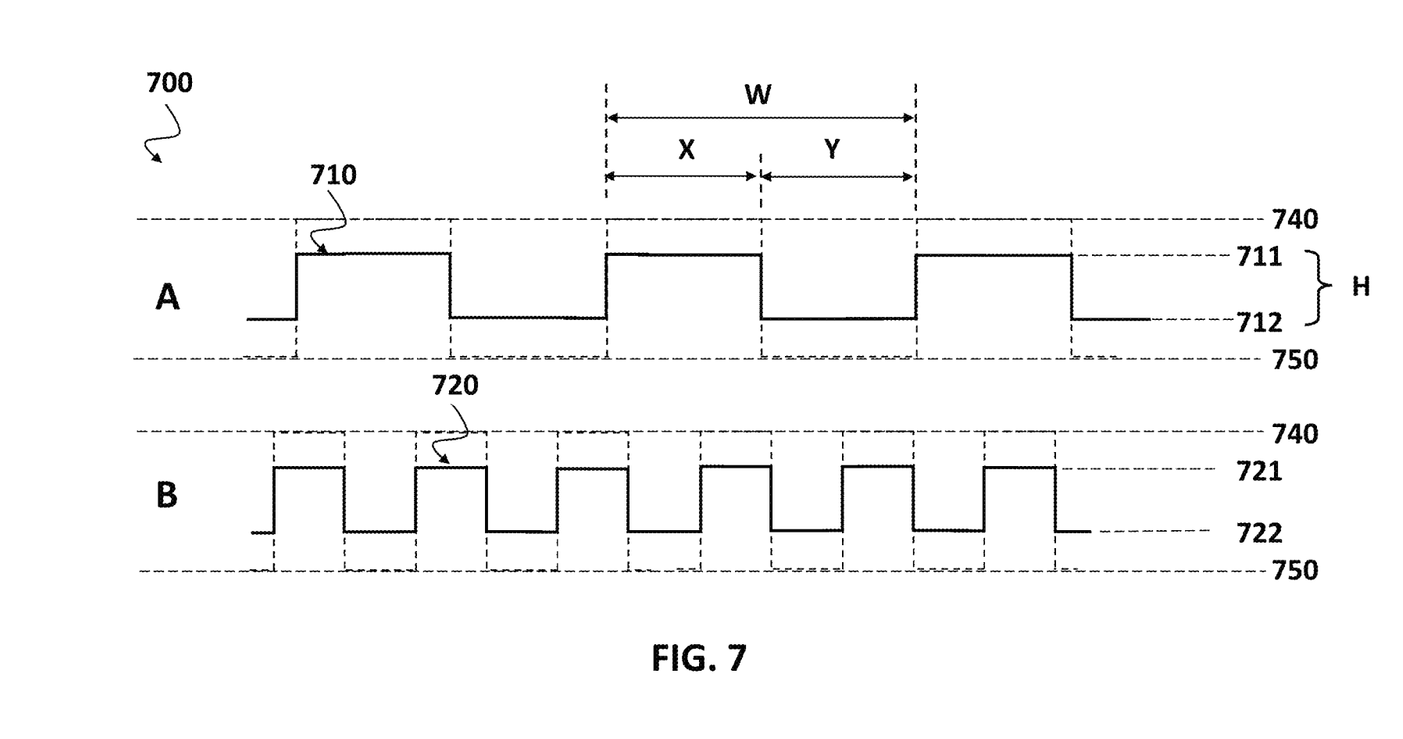
FIG. 7 shows square and rectangular tessellation patterns of different degrees.

According to inventive embodiments of the present disclosure, bezel tessellation patterns providing improved uniformity of illumination may be selected from a shape that is either a full or partial geometric pattern selected from a circle, ellipse, square, rectangle, triangle, polygon, and combinations thereof. To better illustrate this, FIG. 7 shows two embodiments of tessellation patterns 700 including a repeating rectangular pattern (710, plot A) and a repeated square pattern (720, plot B). In these plots, the outer extent of the bezel region, rather tessellated or not, extends to the limit 740 as shown, while the lower extent of the bezel region is denoted by 750, which is either a terminus for the bezel region if a separate physical component or a transition point between the bezel and an adjacent portion of a light shade to which the bezel is either attached or formed contiguously as a part thereof, these outer and lower extents defining the height, span and/or extent of the bezel region. Here also, the uppermost outer end of a tessellated segment of the bezel 710 should not exceed the tessellate segment outer surface or edge 711, and correspondingly, the lowermost end or surface of the tessellated segment should not be lower than the tessellate segment lower edge limit 712, by definition.

With these limits defined as shown in FIG. 7, the example inventive embodiment of a rectangular tessellated pattern shown in plot A is seen to repeat between a maximum height of 711 and minimum depression of 712, the rectangular pattern repeating in a continuous manner without interruption. Here, a repeated unit or cell includes one full cycle of the tessellate pattern (denoted as W), from a maximum to minimum height, as it can be seen that the pattern repeats itself with each repeat of the unit cell if a superimposed image is placed over the original pattern after displacing it either one cell to the left (two steps leftward) or one cell to right (two steps rightward) with respect to the original pattern. In plot A, the tessellated pattern is described as rectangular because the height to width ratio (H: 1/2, where H is the difference in height (separation or distance) between 711 and 712, and W is the width of the full cycle length) is not equal to 1. Here the extent of the unit cell or full cycle is denoted as W, and W is equivalent to the combined width of the upper tessellate segment X of the unit cell, and the lower tessellate segment Y. Further, the value of H will be less than or equal to the spacial difference between 740 and 750.

In other related embodiments of the present disclosure, a repeated unit cell where X and Y differ in width is also suitable, yet still defining the combination as a unit cell of width W. In yet another related embodiment, a combination of two or more different repeated unit cells is also envisioned, being suitable for a flat surfaced bezel but more particularly suited for a curved or non-flat surfaced bezel where the varying heights of two or more different cells (tessellation patterns) could be used to fit a desired curvature or surface profile of a bezel featuring tessellations according to the present disclosure.

In FIG. 7, the second plot B shows another inventive embodiment of the present disclosure, being a square tessellated pattern, described as square because the height to width ratio is equal to 1. Note that the corresponding width, W' (not labelled), of the repeated unit cell in plot B is smaller than W in plot A, having a higher density of tessellations by a factor of about 2. As with the prior example, related embodiments include tessellation patterns in which X and Y differ, but the height factor, H is maintained, as well as alternative embodiments in which X and Y remain the same, and the height of successive tessellation cells differ from one another, for example to follow the outer curvature of a curved bezel surface.

In related embodiments, any repeated geometric shape such as a circle, ellipse, triangle, polygon or combination thereof, can be used as a tessellation pattern to achieve a desired effect on the penumbral illumination characteristics of a lighting unit, or array of lighting units in a luminaire, or alternatively used as a base pattern to generate a smooth and contiguous curve best fitting a selected base pattern to define a convolute tessellated bezel surface or region.

Figure 8:
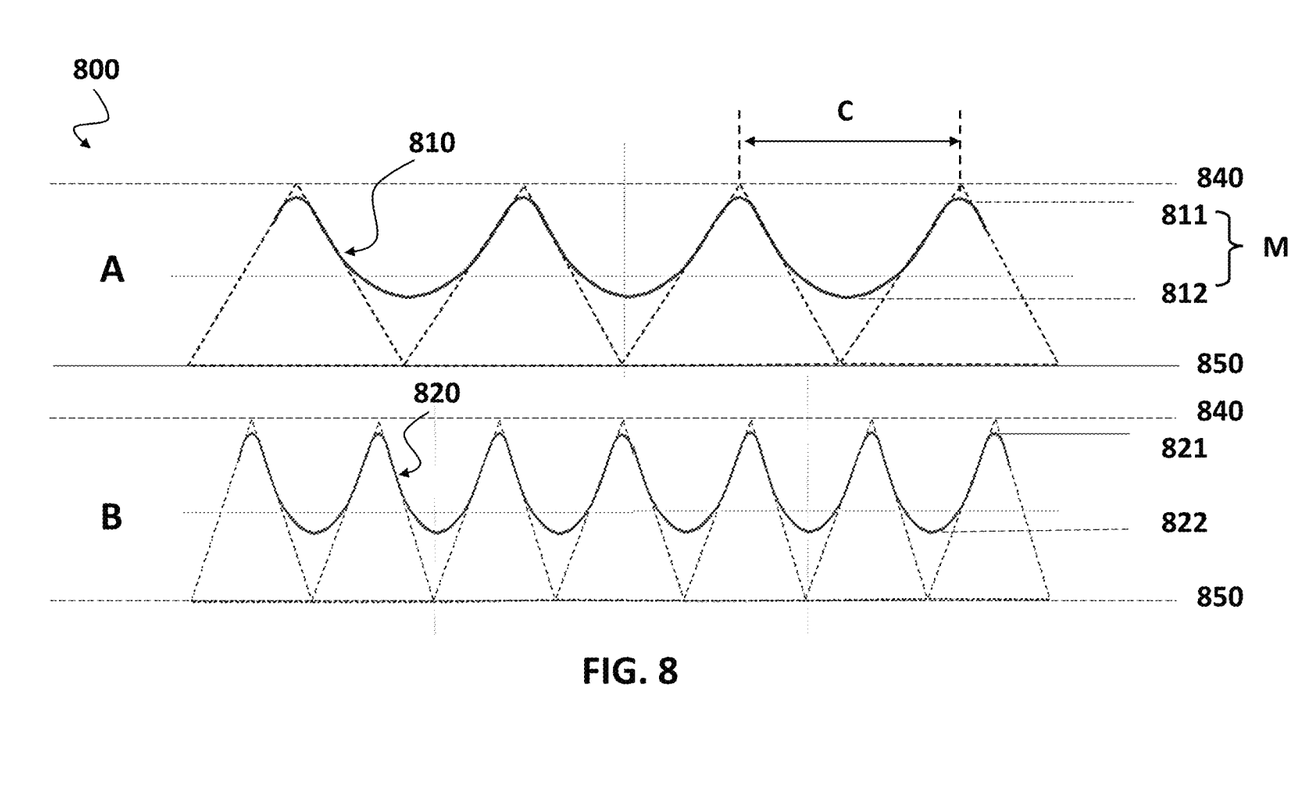
FIG. 8 shows sinusoidal and catenary tessellation patterns of different degrees.

In FIG. 8, two additional inventive embodiments of the present disclosure are shown featuring tessellation patterns (800) exhibiting a catenary curvature with a unit cell of dimension C as shown in plot A. The first tessellation pattern 810 shown in plot A is a repeating cell corresponding to the segment C, or a full cycle similar to one "wavelength" of a repeated oscillating pattern as shown. Here, the outer edge of the bezel is defined by 840 and the bottom or transition edge of the bezel is defined by 850. The magnitude, M, corresponding to the height, H, of the tessellate patterns shown in FIG. 7, describes the extent of the tessellated segment with a maximum extent of 811 and a minimum corresponding to 812, so that M<= (less or equal than) the spacial difference between 840 and 850. In the second plot B, the tessellated pattern 820 unit cell dimension C' (not labelled) is less than C for tessellated pattern 810, by a factor of roughly 2:1, thus appearing to have about twice the frequency and about one half the "wavelength" or one half the number of tessellations as the pattern shown in plot A.

In related embodiments to those disclosed in FIG. 8, repeated curve-styled tessellations include curves selected from mathematical functions including catenary, cosine, arc cosine, hyperbolic cosine, hyperbola, sine, arc sine, hyperbolic sine, polynomial, and combinations thereof. Further, in related embodiments these curve-styled tessellations can be truncated on either their upper of lower extents by rendering the tessellation height 811 to be greater than the maximum bezel height 840, so that any pattern exceeding this limit is reduced to a flat, linear segment parallel to line 840, and in a similar manner by rendering the tessellation depth 812 to below its present value 812 as shown to produce a shallower depth for the lower half-cycle of the repeated cycle, or alternatively rendering the tessellation depth 812 to below the maximum depth 850 to produce truncation resulting in a flat, linear segment parallel to line 850 for any portion of the curve that would otherwise have passed below 850. In this manner, the peaks and valleys of any repeated tessellation pattern can be modified to clip the maximum peak value to 840 and/or the minimum valley value to 850, producing singly or doubly truncated versions of the curve-styled tessellation patterns to achieve the desired lighting effect.

In general, without being bound by theory, it is believed that adjustment and selection of the depth of the tessellation, H or M, enables control of the extent or width of the penumbral zone when the tessellated bezel is used in conjunction with a lighting unit. Further, without being bound by theory, it is believed that adjustment and selection of the repeated cell or pattern width, W or C, enables control of uniformity of illumination within the penumbral zone, these two factors being capable of independent manipulation and selection so as to achieve the most desired lighting effect in which the penumbral illumination zone is more uniform in nature and also transitions smoother with respect to light intensity between both the non-illuminated and illuminated (directly lit) portions of an illumination plane lighted by the inventive lighting units and luminaires according to the present disclosure.

Additional inventive embodiments include curvaceous-styled tessellations selected from cosine, arc cosine, hyperbolic cosine, hyperbola, sine, arc sine, and hyperbolic sine functions, which generally feature a uniform repeating cell with a constant frequency of C and a constant height of M. However, to produce a curvaceous-style tessellation of varying C and M, related additional embodiments include curves fitted by polynomial function to a repeated or base pattern of shapes so as to produce an edge with desired tessellate patterns that can vary in spacing and in depth. For example, in FIG. 8, the first plot A is seen to be a catenary function best fitted to a pattern of repeating unit equilateral triangles (as denoted by dotted lines). Here, the maximum 811 and minimum 812 of the pattern was determined by a linear-least squares optimization to maximize the value of 811 to be as close to the bezel limit 840, which results in a somewhat shallow pattern with a depth of 812 for the tessellate curve 810, while maintaining a good overall fit In the second embodiment shown in the second plot B, a second catenary function is best fitted to a pattern of repeating non-equilateral triangles (as denoted by dotted lines in the lower plot), producing a tessellate curve 820 that is similar in style to curve 810, as a result of selecting a maximum in the value of 821 to be as close to the bezel limit 840 as possible while maintaining a good overall fit. It is noted that this fitting produces a curve with sharper peaks than valleys, as opposed to a symmetric sinusoidal waveform with equal distribution above and below its centerline or average value.

Accordingly, in related embodiments of the present disclosure, inventive tessellation patterns include curve-style patterns derived by fitting a polynomial to any set of repeated base geometric shapes, such as a triangle, square or rectangle. For example, using the repeated equilateral triangle base pattern as shown in plot A of FIG. 8, a polynomial curve can be fitted to the peaks and valleys to generate a smooth best-fit curve corresponding to:

$$y=(a)x+(b)x^2+(c)x^3+(d)x^4+(e)x^5+\ldots(n_k)(x^k)+z \qquad \text{Eq. 3}$$

wherein y is the best-fit curved surface profile, k is an integer selected from k=1, 2, 3, 4, 5, ..., x is a op timizable dimensional parameter and the constants, a, b, c, d, ... are the independent scaling factors for each term or order of the polynomial, being a polynomial of rank k, and z is a non-integer displacement constant. Typically, a polynomial of rank 5 is sufficient to generate a smooth curve to define a desired tessellation pattern by fitting to any desired repeated pattern of tessellations using a base pattern as a model, in order to achieve a desired lighting effect or to optimize the performance of a luminaire or lighting unit using a fully or partially tessellated bezel. This approach is particularly effective in producing tessellation patterns for non-repeated base patterns or curved tessellated bezel portions where a further geometric constraint is present requiring a least-squares or iterative calculation approach to generate and optimize the best-fitting curve or function.

In further related embodiments of the present disclosure, inventive tessellation patterns include fractal patterns, for example including but not limited to, n-degree fractal derivatives of a selected geometric pattern, where the order of the derivative or reduction is defined as n, and n is an integer that can be selected from between 1 and 5, typically.

Figure 9:
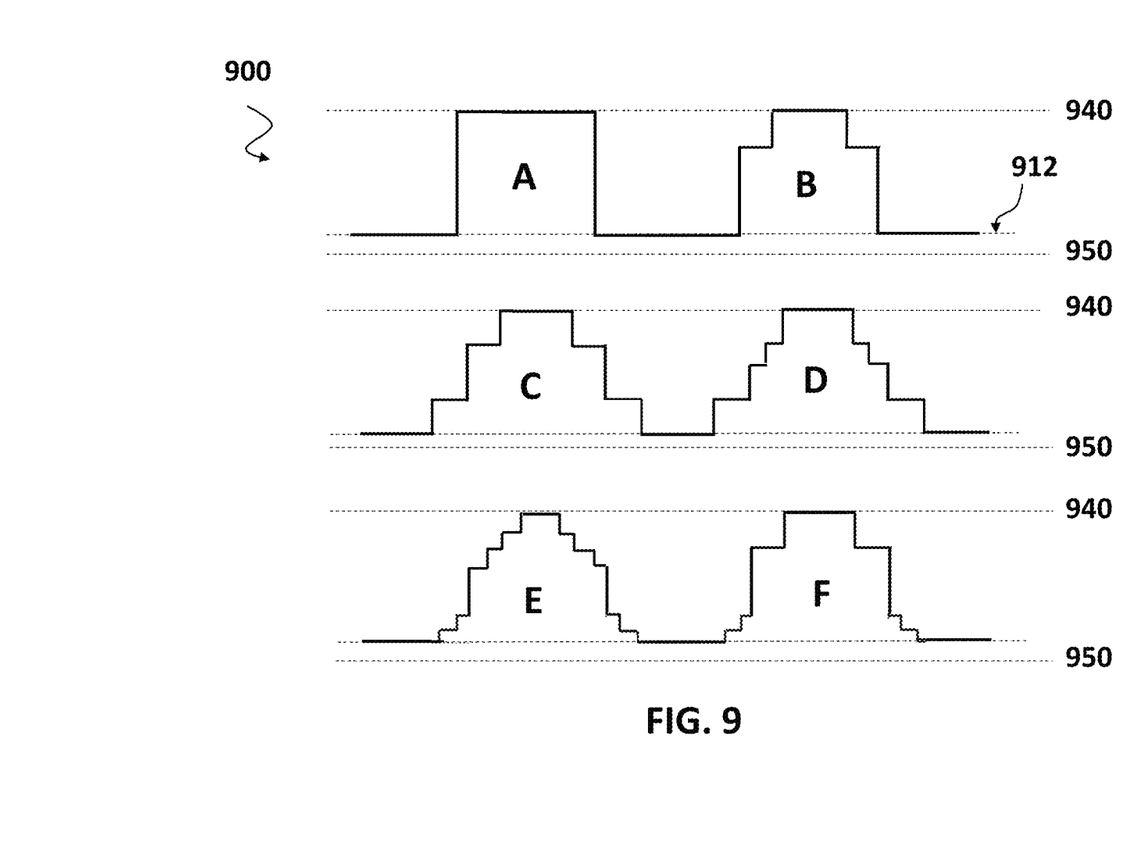
FIG. 9 shows square and fractal reductions of square tessellation patterns of different fractal orders and combinations.

FIG. 9 shows several embodiments of a fractal tessellation pattern 900 based on a unit repeating square, shown as A, being the starting pattern and referred to here as a zeroth ($0^{th}$) order base pattern. Without any further fractal reduction, the tessellate pattern A is a repeated series of square tessellations with a peak at 940 and valley at 912, within the tessellated bezel region spanning 940 and 950, being the tessellated bezel or alternatively, the tessellated portion of a light bezel. When a fractal reduction is applied to only the uppermost portion of the tessellate pattern, as shown by pattern B, the upper right and left side of the prior square pattern is reduced by a unit square of some desired step size, corresponding to the size of the reduced area, and selected based on the extent of granularity desired. This reduction has the effect of subtractively "smoothing" the right and left edges of the zeroth order square tessellation, without changes to the lower portion of the tessellation. In an alternative inventive embodiment, pattern C shows a similar fractal rendition comprising a $1^{st}$ order fractal reduction of the uppermost portion of the tessellate pattern and a $1^{st}$ order fractal "addition" to the lowermost right and left portions simultaneously. This process of fractalization acts to convert a repeated base pattern into a smoother pattern with improved performance characteristics as disclosed herein. In further related embodiments, any desired step size can be employed, and any base pattern can be used as a starting point to define a final tessellation pattern suitable for use on a bezel according to the present disclosure. Other inventive embodiments include combinations of fractal reductions and additions to define a desired fractal tessellation pattern, such as pattern D which features both $2^{nd}$ order reductions of a select portion of the prior base pattern and an intermediate $3^{rd}$ order reduction. In FIG. 9, additional inventive embodiments using other combinations of $2^{nd}$, $3^{rd}$ and $4^{th}$ order fractal reductions and additions are shown by patterns E and F. These are non-limiting examples of employing a fractal modification on a base pattern to produce a smoother tessellation pattern based on a repeated geometric base pattern, in order to achieve one or more desired performance enhancements according to the present disclosure.

Figure 10:
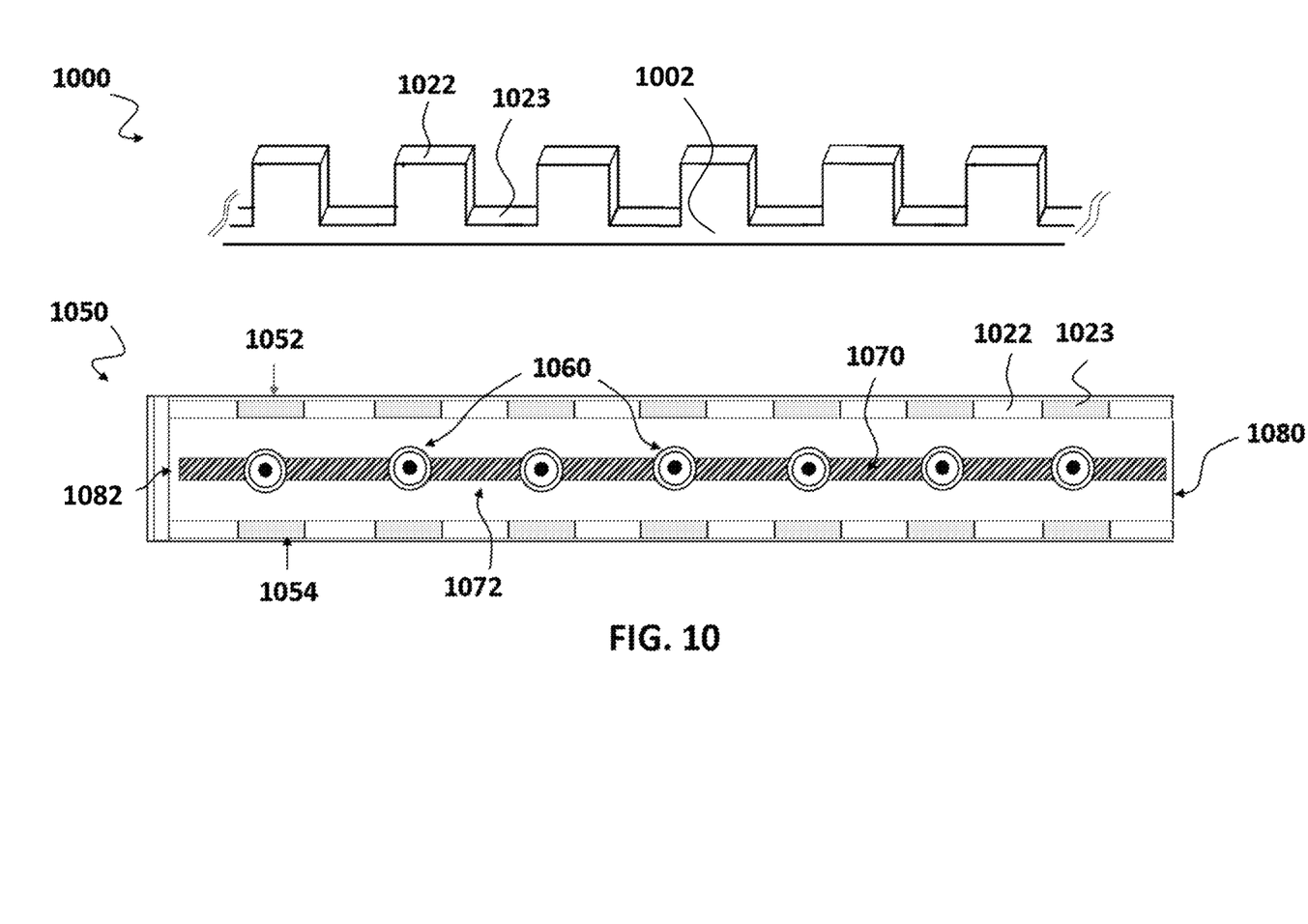
FIG. 10 shows a linear luminaire with two opposing bezels featuring square tessellation patterns.

As seen in FIG. 10, tessellated linear bezels are also contemplated for use with lighting units and luminaires as additional embodiments of the instant disclosure. A linear tessellated bezel 1000 features a repeated series of square tessellates with a height of 1022, also corresponding to the width or separation between the peaks, a valley defined as 1023, transitioning to the lower bezel portion 1002. An example embodiment of a linear tessellated luminaire 1050 featuring an array of LEDs with two tessellated linear bezels is also shown in FIG. 10, featuring a first and second linear bezel 1052 and 1054, respectively, located on opposed sides of the luminaire body. A regularly spaced and repeated array of individual LED lighting elements 1060 are mounted on an LED mounting and power strip 1070 that is secured onto a luminaire mounting plate 1072. In this embodiment, the left side of the luminaire 1050 is terminated with a plain bezel 1082, while the right side of 1050 is open 1080, so that this first luminaire 1050 can be joined to an adjacent luminaire, positioned end-to-end for an extended luminaire system without a lighting gap between them. In other embodiments, either or both of 1080 and 1082 can be a plain bezel, a tessellated bezel to form a completed luminaire, or open without a bezel in position to enable joinder to an adjacent luminaire for an extended array.

In addition to closed circular-style bezels shown in various inventive embodiments above, and linear bezels as shown in FIG. 10, other bezel shapes, sizes and geometries, whether open or closed, are well suited for modification to produce a partially or fully tessellated edge to the respective bezel in order to achieve the improved illumination properties described herein when used with a light source or in a luminaire with a light source or array of light sources. As a non-limiting example, an elliptically shaped and continuous bezel with at least one tessellated section along the light bezel portion would be an alternative smooth geometrically shaped embodiment, while a hexagonal shaped luminaire with an outer hexagonal bezel with at least one tessellated section along the periphery would be an alternative geometrically shaped embodiment, selected from any closed or open geometric pattern.

Light Sources

Another inventive embodiment of the present disclosure is a luminaire wherein the light source is a solid state light source selected from an LED, LED array, Lambertian emitter, $2\pi$ emitter, and fiber optic light guide.

Yet another inventive embodiment of the present disclosure is a luminaire wherein the light source is a linear light source selected from an incandescent lamp, fluorescent tube, linear LED, linear LED array, linear Lambertian emitter, and linear fiber optic light guide or the like.

Materials of Construction

Any suitable material that is acceptable for use as a light bezel or bezel for a light source or luminaire can be employed, including, but not limited to plastics, polymers, metals, alloys, wood, composites, cellulosic materials, and combinations thereof. Generally, embodiments presented herein employ opaque materials that are not inherently light transmitting, so that the tessellated patterns of the respective bezels produce the desired improvements to illumination as disclosed herein. In related embodiments, combinations of transparent, translucent or at least partially light transmitting materials may also be employed in combination with more opaque or less light transmitting materials to form optically tessellated bezels that employ regions of light transmitting and non-transmitting materials in patterns selected from those tessellation patterns disclosed herein, to produce an optical effect similar to that described here with fully opaque bezels whose tessellation patterns are made by addition or subtraction of material from a bezel edge. Accordingly, by way of a nonlimiting example, an optical tessellated bezel formed by coextrusion of two materials, a first light transmitting material and a second opaque material otherwise being physically co-ex trudable, in a manner to form one or more of the tessellation patterns disclosed herein, wherein the opaque material corresponds to a tessellated feature or pattern and the light transmitting material is present and corresponds to what would otherwise be the open spaces or open tessellate portions in the tessellation bezel. In these related inventive embodiments, light passes through the transparent, translucent or light transmitting regions in a similar manner as in embodiments where light passes through an open space in the tessellated region, although the light is attenuated to some extent by passing through the first material.

In related embodiments, the tessellation patterns, rather than being subtractions or additions of material to a bezel edge, may be formed by combining light-transmitting and non-light transmitting (opaque) portions that are physically distinct from one another, located immediately adjacent to one another in a manner that produces an optical tessellation pattern similar to any inventive tessellation pattern described herein.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

APPENDIX

| Figure Key | | |
|---|---|---|
| FIG. 1 | | |
| 100 | Lighting unit | |
| 102 | Tessellated bezel region with tessellations 101 | |
| 103 | Plain light shade region | |
| 104 | Light shade element | |
| 106 | Support plate | |
| 108 | Light shade mounting region | |
| 110 | LED mounting rail | |
| FIG. 2 | | |
| 200 | Lighting unit | |
| 202 | Tessellated bezel region with tessellations 201 | |
| 204 | Light shade element | |
| 205 | Light shade LED region | |
| 206 | Support plate | |
| 208 | Light shade mounting region | |
| 210 | LED mounting rail | |
| 212 | LED attachment region | |
| FIG. 3 | | |
| 300 | Fully tessellated lighting unit | |
| 301 | Partially tessellated lighting unit | |
| 302 | Tessellated bezel region | |
| 303 | Non-tessellated bezel region | |
| 304 | Light shade element | |
| 312 | LED attachment region | |
| 320 | Center rotation axis | |
| 322 | Vertical axis | |
| 324 | Horizontal axis | |
| 326 | Rotational increment | |
| FIG. 4 | | |
| 401 | Partially tessellated bezel | |
| 402 | Tessellated Bezel region | |

| Figure Key (continued) | |
|---|---|
| 403 | Non-tessellated bezel region |
| 404 | Light shade element |
| 406 | Support plate |
| 408 | Light shade mounting region |
| 414 | LED attachment element |
| 423 | Bezel tilt angle |
| 424 | Horizontal plane |
| 425 | Top plane of lighting unit |
| FIG. 5 | |
| A | Plain bezel |
| B | Partially tessellated bezel |
| C | Luminosity plot of B |
| 514 | LED light source (x) |
| 550 | Illumination plane |
| FIG. 6 | |
| A, B | Illumination planes |
| 603 | Distance from wall |
| 630 | Plain bezel array |
| 631 | Plain transition region |
| 640 | Partially tessellated bezel array |
| 641 | Tessellated transition region |
| 630 | Plain bezel array |
| FIG. 7 | |
| 700 | Rectangular tessellations |
| 710 | Pattern 1 |
| 720 | Pattern 2 |
| 711 | Tessellate segment outer edge |
| 712 | Tessellate segment lower edge |
| 740 | Maximum bezel height |
| 750 | Bezel transition region |
| FIG. 8 | |
| 800 | Curvilinear Tessellations |
| 810 | Pattern 1 |
| 820 | Pattern 2 |
| 811 | Bezel outer edge |
| 812 | Bezel lower edge |
| 840 | Maximum bezel height |
| 850 | Bezel transition region |
| FIG. 9 | |
| 900 | Fractal tessellations |
| A | $0^{th}$ order base pattern |
| B | $1^{st}$ order reduction |
| C | $2^{nd}$ order reduction |
| D-F | $2^{nd}$, $3^{rd}$ and higher order combinations |
| FIG. 10 | |
| 1000 | Tessellated linear bezel |
| 1002 | Lower portion of bezel |
| 1022 | Outer edge of bezel |
| 1023 | Inner edge of tessellation pattern on bezel |
| 1050 | Linear tessellated luminaire |
| 1052 | First tessellated linear bezel |
| 1054 | Second tessellated linear bezel |
| 1060 | Individual LED lighting elements |
| 1070 | LED mounting and power strip |
| 1072 | Luminaire mounting plate |
| 1080 | Open end of luminaire |
| 1082 | Terminated end of luminaire |

What is claimed is:

1. A luminaire with improved light dispersion properties comprising:

a) a plurality of light emitting elements;

b) a a plurality of light shades each positioned adjacent to and surrounding a respective one of said light emitting elements and located about an optical axis perpendicular to said respective one of said light emitting elements;

wherein each one of said light shade features a mounting region located at a first distal edge, a plain light shade region continuous with said mounting region, the plain light shade region being continuous with a bezel region that terminates at a second opposed proximate edge;

wherein said bezel region features an upper surface having at least one tessellated edge; and wherein said tessellated edge provides for a more uniform direct and penumbral light transmission pattern as compared to a non-tessellated edge;

wherein said bezel region features a combination of a tessellated region and a non-tessellated region; and wherein said tessellated region has at least one tessellated pattern and said non-tessellated region is plain.

2. The luminaire of claim 1, wherein said bezel region features at least one or a plurality of tessellation patterns corresponding to a k-th degree polynomial fit of a shape comprising either said full or partial geometric pattern; and wherein k is an integer between 1 and 5.

3. The luminaire of claim 1, wherein said bezel region features at least one of a plurality of tessellation patterns corresponding to a n-fractal derivative of said geometric pattern; and wherein n is an integer between 1 and 5.

4. The luminaire of claim 1, wherein each of said light shades bears at least one portion of the same bezel pattern and wherein each of said bezels is at least partially tessellated.

5. The luminaire of claim 1, wherein at least one of said light shades bears at least one unique bezel pattern with at least one tessellation pattern differing from the tessellation pattern of an adjacent light shade.

6. The luminaire of claim 1, wherein at least one of said light shades features an angled bezel region that is at least partially tessellated and is disposed about an optical axis that is not perpendicular to that of said light emitting elements.

7. The luminaire of claim 1, wherein said light shade has an overall geometry selected from shapes including a circle, ellipse, square, and a rectangle; and wherein said optical axis corresponds to the mean geometric center axis of the selected shape.

8. The luminaire of claim 1, wherein said light shades do not curve back onto themselves and are at least partially tessellated along a portion of said bezel.

9. The luminaire of claim 1, wherein two light shades are disposed opposite one another and aligned with respect to a horizontal axis passing through each of said light emitting elements; wherein at least one of said light shades feature at least one partially tessellated edge along a portion of said bezel.

10. A luminaire with improved light dispersion properties comprising:
a) a plurality of light emitting elements;
b) a plurality of light shades each positioned adjacent to and surrounding a respective one of said light emitting elements and located about an optical axis perpendicular to said respective one of said light emitting elements;

wherein each one of said light shade features a mounting region located at a first distal edge, a plain light shade region continuous with said mounting region, the plain light shade region being continuous with a bezel region that terminates at a second opposed proximate edge;

wherein said bezel region features a first upper surface and second lower transition region adjacent to said plain light shade region; wherein said bezel region features a combination of a first opaque and non-light transmitting portion composed of a first material and a second light transmitting portion composed of a second material; wherein said first and second portions create an optical tessellation pattern; and wherein said optical tessellation pattern provides for a more uniform direct and penumbral light transmission pattern as compared to a non-tessellated edge.

11. The luminaire of claim 10 wherein said second light transmitting portion is selected from a second material that is clear, translucent or partially light-transmitting; wherein said first material may either be a different material than said second material, or said second material infused or treated to provide opacity thereto so that the first portion is opaque and non-light transmitting.

* * * * *